United States Patent [19]
Knuppel et al.

[11] 3,774,894
[45] Nov. 27, 1973

[54] METHOD AND CONVERTER FOR REFINING PIG IRON

[76] Inventors: Helmut Knuppel, Richard-Wagner-Strasse 1, Sulzbach-Rosenberg; Karl Brotzmann, Fentschweg 6, Sulzbach-Rosenberg Hutte; Hans-Georg Fassbinder, Schelmesgraben 20a, Sulzbach-Rosenberg, all of Germany

[22] Filed: Jan. 18, 1971

[21] Appl. No.: 119,258

Related U.S. Application Data

[62] Division of Ser. No. 821,802, May 5, 1969.

[30] Foreign Application Priority Data
Feb. 27, 1969   Germany............... P 19 09 779.1

[52] U.S. Cl. ............................................... 266/35
[51] Int. Cl. ............................................ C21c 7/04
[58] Field of Search ............... 266/35, 36 P, 34 A, 266/34 T, 34 PP

[56] References Cited
UNITED STATES PATENTS

| | | | |
|---|---|---|---|
| 3,330,645 | 7/1967 | Moustier et al. | 266/34 PP |
| 2,977,108 | 3/1961 | Cogelja et al. | 266/41 |
| 3,490,755 | 1/1970 | Lutgen | 266/34 PP |

FOREIGN PATENTS OR APPLICATIONS

| 1,450,718 | 7/1966 | France | 75/60 |
|---|---|---|---|

*Primary Examiner*—Gerald A. Dost
*Attorney*—Lawrence I. Field

[57] ABSTRACT

The invention relates to a method of refining pig iron, particularly with a high phosphorus component, in a bottom blown converter in which oxygen mixed with powdered lime is blown into the melt through the bottom of the converter. According to the invention the jets of oxygen mixed with suspended powdered lime blown into the melt through the bottom of the converter are protected by a surrounding sheath of a jacket gas which is preferably inert or slow to react with the melt.

6 Claims, 5 Drawing Figures

METHOD AND CONVERTER FOR REFINING PIG IRON

This application is a division of Ser. No. 821,802, filed May 5, 1969.

High phosphorus pig irons are usually refined by the customary Thomas process, or by the more recently developed LDAC process, the melt being refined under a slag which is high in lime. In the LDAC process, pure oxygen mixed with powdered lime is blown from above onto the surface of the molten mixture through a water-cooled lance, the molten mixture consisting of pig iron, scrap and the necessary amount of lime. During the refining there is very rapidly formed a slag high in ferrous oxide and therefore capable of reacting with the molten metal to remove phosphorus. This process, compared to the customary Thomas process, allows the phosphorus removal to proceed early during the refining, that is to say the phosphorus is removed simultaneously with the carbon. However although the LDAC process is nowadays more and more replacing the cutomary Thomas process, nevertheless it has a number of disadvantages. In the first place the oxygen is not fed directly into the molten metal, but is blown downwards onto the surface of the slag, giving the slag a high content of ferrous oxide, resulting in excessive loss of iron and a reduced yield. A further disadvantage of the LDAC process is that the slag, due to its high content of iron, is comparatively unsuitable as a fertiliser. Furthermore these slags high in ferrous oxide tend to foam. The high ferrous oxide content of the slag, together with the comparativey high carbon content of the melt, produces an unbalance which results in an eruptive expulsion of iron and slag from the converter, that is to say a splashing out.

A further important disadvantage of the LDAC process is that to bring the phosphorus content down sufficiently it is necessary to use two slags one after the other. The refining has to be interrupted at a carbon content of between 0.7 and 1 percent, and the slag removed. The resulting slag, from this first part of the refining process, contains approximately 10 percent iron and 20 percent phosphoric acid, assuming that the phosphorus in the melt is approximately 0.2 percent. The blow is then continued, a quantity of powdered lime being blown in, with the result that a new slag is formed, allowing the phosphorus content to be reduced down to below 0.025 percent. The slag produced during the second blow is left in the converter to act as the first slag for the next charge. The LDAC process is comparatively ineffective in removing phosphorus. This is due to the fact that after the carbon has been removed the melt is agitated only by the jet of oxygen. The movement of metal in the bath is therefore limited almost entirely to a compartively shallow surface layer. The jet of oxygen produces a hot spot on the surface of the melt, causing a considerable quantity of the iron to go into the slag. This not only results in a poor yield, but also produces large quantities of the undesired brown smoke.

Compared to this, the older Thomas process, in which air or air mixed with a certain amount of extra oxygen, is blown into the melt through nozzles installed in the converter bottom, possesses certain advantages and certain disadvantages. The advantages of the Thomas process are that the oxygen in the blow oxidises the iron to ferrous oxide near the outlets of the nozzles. The ferrous oxide acts as a carrier for oxygen and efficiently removes impurities from the iron, in the sequence: silicon, manganese, carbon, phosphorus. These reactions take place all through the body of the melt, which is thoroughly agitated by the ballast nitrogen in the blow. The diffusion paths are comparatively short. On the other hand the nitrogen in the blow, which is at least 60 percent of the blown air, unavoidably increases the nitrogen content of the steel, and also causes important heat losses. The amount of scrap which can be added to the charge is therefore comparatively low. It is not feasible to increase the oxygen in the blow to above 40 percent, due to the resulting production of large quantities of brown smoke, and due to very rapid wear of the converter bottom, even if copper blow tubes are used. The Thomas process has a still further disadvantage, in that the oxidation of the phosphorus does not begin until carbon removal is almost complete, that is to say there is a transition point, and phosphorus removal does not begin until this is reached. Numerous attempts have been made to promote an earlier removal of phosphorus, if possible to advance the removal of phosphorus so that it takes place simultaneously with the removal of carbon. Among the experiments made in this direction, a series of tests were made using an experimental converter with a capacity of 50 kg pig iron. The converter was equipped with a water cooled nozzle mounted in a water cooled cooper plate. Through this nozzle a jet of oxygen was blown loaded with powdered lime. The results of these tests showed that it is quite feasible to blow powdered lime suspended in oxygen, and this does advance the removal of phosphorus. However this method has not been adopted on an industrial scale for refining steel, due to the dangers involved in using water cooling. Furthermore this method, due to the fact that pure oxygen is blown, produces an enormous quantity of brown smoke. The method is therefore not an economic process, for this reason alone. A final difficulty which has hitherto not been overcome is to distribute the powdered lime equally between the individual nozzles. The Thomas process has therefore hitherto been limited to using an oxygen enriched blow, the lime being added through the mouth of the converter.

The object of the present invention is therefore to provide a process for refining pig iron, particularly high phosphorus pig iron, in which pure oxygen loaded with powdered lime is blown into the melt through the converter bottom, the process producing very little brown smoke and the phosphorus removal taking place simultaneously with the removal of carbon. A further object is to produce a slag containing a high concentration of soluble phosphoric acid, which is suitable for application as a fertiliser.

In accordance with the invention a method of refining a melt of pig iron in a bottom blow converter comprises blowing at least one jet consisting of a mixture of oxygen with powdered lime suspended in it into the melt through the bottom of the converter the jet being surrounded by a sheath of jacket gas. The jacket gas is preferably either an inert gas or a gas which is slow to react.

The blowing, according to the invention, of a jet containing reagent in suspension, surrounded by a sheath of jacket gas, has the effect of slowing down the violent reaction between the oxygen and the melt, at the same time protecting the nozzles themselves and the converter bottom from slag formation by reaction with the oxygen. The production of brown smoke is at the same time decreased to such a degree that it is no longer necessary to use expensive gas cleaning installations. The metallurgical advantages of the process according to the invention derive from the fact that the ferrous oxide formed by the oxygen at the prevailing high temperatures combines with the powdered lime to form a very reactive slag which rises slowly towards the surface of a melt in the form of a very fine suspension. The slag rises slowly because only a comparatively small quantity of gas is blown into the melt, and consequently a rapid removal of phosphorus begins very early during the refining process. Due to the large area of reactive surfaces, the continuous supply of fresh slag rising from the converter bottom and the slow rate of rising of the slag particles, the rate of removal of both sulphur and phosphorus is so high that phosphorus removal is complete practically as early as the removal of carbon, that is to say the two processes are completed at just about the same instant. This fact has been verified in experimental melts in which the converter was charged with a pig iron containing 3.5 percent carbon and 1.7 percent phosphorus. The resulting slag has a high concentration of soluble phosphoric acid, but contains very little iron. The process according to the invention therefore provides considerably higher yields than the known LDAC process.

It has surprisingly been found that the advancing of phosphorus removal can be controlled within wide limits by suitably adjusting the grain size of the powdered lime. For example using a powdered lime with a maximum grain size of 1 mm, the metallurgical process taking place during the refining is quite similar to what happens in the Thomas process, that is to say very little phosphorus is removed during the removal of the carbon. The phorphorus begins to be separated from the iron only after almost all the carbon has been removed from the melt. On the other hand when a powdered lime is used which has a maximal grain size of 0.1 mm, it is found that phosphorus is removed even faster than carbon. A melt which contained 0.5 percent of carbon allowed the phosphorus concentration to be brought down to approximately 0.030 percent. The process according to the invention can be used to produce melts which are high in carbon and contain only medium amounts of phosphorus. Alternatively if desired the high phosphorus slag can be removed and the refining continued using a second slag, to give extremely low phosphorus concentrations. In this way it is possible to produce steels from high phosphorus pig irons which have hitherto been produced by the oxygen bottom blow process only from low phosphorus pig irons. When a very fine powdered lime is used, of grain size less than 0.1 mm. It is surprisingly found that not only is the phosphorus removed, but also a large part of the sulphur.

The process according to the present invention is not limited to using high phosphorus pig iron as the raw material, although it is in this application that the greatest advantages are obtained. The process can for example be used in the refining of steelmaking pig irons, allowing steels to be obtained which are extremely low in both phosphorus and sulphur. Only quite small quantities of slag are required. Hardly more than half the amount of lime is necessary, compared to the usual process in which the lime is simply added to the melt.

For the jacket gas hydrogen and hydrocarbons have been found to be particularly suitable. These jacket gases have a cooling effect around the nozzle outlets, and effectively protect the nozzles and also the converter bottom from wear. The oxygen conveying the powdered lime in suspension can if desired be blown into the melt at an angle with respect to the surface of the melt, so as to produce a circulation in the melt. For this purpose the nozzles themselves are inclined at an angle. If this is done then the slag can be blown out of the converter by means of a jet of combustion gas containing no powdered lime. This variant of the process according to the invention produces particularly advantageous results when it is desired to make a steel containing extremely little phosphorus and with the lowest possible loss of iron. For this purpose the first slag is removed at the end of about 2/3rds of the total blowing time. The blow is completed using increased amounts of powdered lime.

The powdered lime can if desired be blown into the converter through all the nozzles. Alternatively some of the nozzles can be fed with pure oxygen, in which case these pure oxygen jets are also protected with sheaths of jacket gas, to prevent the formation of brown smoke. If it is found, towards the end of the refining process, that deposits of slag have built up around the nozzle outlets, than all that is necessary is to finish the blow using a mixture containing between 10 and 20 percent of pure oxygen and between 90 and 80 percent of nitrogen. Finally there can be used, during the refining process, suspensions of other solids, based for example on iron ore, fluorspar, sodium hydroxide, or bauxite, and if desired these solids can be mixed with powdered lime. In this way the refining process can be influenced in one direction or another.

A particularly efficient utilisation of the slag forming substances, mainly the lime, is obtained by blowing them equally distributed through all the nozzles. However the refining process may require a change in the quantities used during the refining. For example it has been found advantageous to increase the addition of lime towards the end of the blow.

The process according to the invention is preferably conducted in a bottom blow converter, which, in accordance with another feature of the invention comprises a steel jacket with a refractory lining and an inserted refractory floor containing nozzles, at least one nozzle consisting of a feed pipe for the oxygen-lime mixture surrounded by a concentric feed pipe for the jacket gas.

A particularly quiet refining process, involving very little splashing out, is obtained by using the following operational quantities. Oxygen pressure is between 6 and 10 atmospheres gauge. The oxygen contains between 1 and 2 kg/$Nm^3$ of powdered lime. The pipe conveying the reagents has an internal diameter not more than one thirty-fifth of the depth of the melt. The velocity of flow of the oxygen containing the powdered lime is about 30 percent less than that of the oxygen containing no lime. For example using a blow pressure of 8 atmospheres gauge, the pure oxygen flows at 200 $Nm^3$/h per $cm^2$ of nozzle cross section, whereas the oxygen loaded with powdered lime flows at the rate of approximately 130 $Nm^3$/h $cm^2$ of nozzle cross section. For example in the case of a converter with a capacity of 30 tons, the depth of the melt being 0.7 m, there were consumed 60 $Nm^3$ of oxygen per ton of steel produced. The blowing period was required to be at most 20 minutes. The rate of flow of oxygen was therefore 5,400 Nm³/h. On this basis the necessary total nozzle cross sectional area is calculated to be 5,400/130 = 42 cm², approximately. The depth of the melt being 0.7 m, the greatest permissible nozzle diameter is 2 cm. There are therefore required 42/3.14 = 14 nozzles.

The suspension of reagent is conveyed into the converter for example through a conical pot mounted under the converter floor, the mixture reaching the pot through a tangential supply pipe and leaving the pot through at least one distributor feed pipe leading away radially away from the pot and situated at a distance from the supply pipe. A very even distribution of the powdered lime is obtained by connecting the supply pipe to the distributor pot near the top, and connecting several equally spaced distributor feed pipes to the lower part of the pot.

Alternatively the converter may have a cylindrical distributor pot mounted underneath the converter floor, the cylindrical distributor pot being sub-divided into two compartments by a horizontal intermediate partition wall which is permeable to gas. The suspension is fed into the upper part of the pot through a reagent supply pipe. Pure oxygen is fed to the lower part of the distributor pot through an oxygen supply pipe. At least one distributor feed pipe is connected radially to the upper part of the pot. Preferably however the suspension of reagents is distributed to the converter nozzles through several reagent distributor pipes spaced at equal distances apart and connected radially to the upper part of the distributor pot.

As another alternative, the suspension of reagents can if desired by conveyed into the converter through a distributor duct of shallow rectangular cross section mounted underneath the converter floor. The distributor is sub-divided near its outlet end into several individual reagent ducts. The distributor duct is curved in a plane extending at right angles to its wider surfaces. The distributor is branched into separate channels preferably by means of divergent separating walls, so as to form equally spaced individual channels. The converter is preferably a body of rotation symmetrical about is longitudinal axis, to allow slag to be poured off to one side, and molten metal to the other side, with the converter in its reclining position.

The method and apparatus according to the invention will now be described by way of example with reference to the accompanying drawings, in which.

Figure 1:
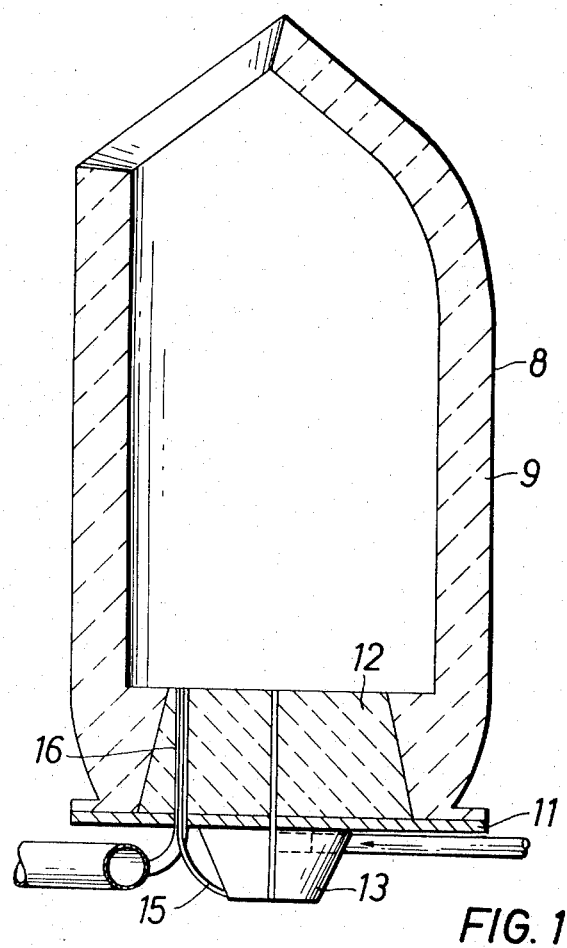
FIG. 1 is a longitudinal axial section through one converter.
Figure 2:
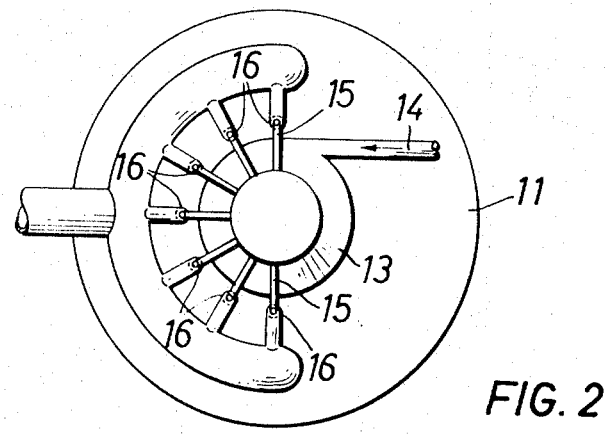
FIG. 2 is a plan view of the bottom of the converter of FIG. 1.

The converter illustrated in FIGS. 1 and 2 consist in the usual way of a steel jacket 8 with a refractory lining 9 and an inserted bottom 12 which rests on a bottom plate 11, to which is attached a conical distributor pot 13. A feed pipe 14 for oxygen and powdered lime is joined tangentially to the upper, wider part of the conical distributor pot 13. Radial distributor pipes 15, equally spaced apart, are connected to the lower part of the pot 13. Each distributor pipe 13 curved upwards and penetrates through the bottom 12 of the converter, each distributor pipe 15 being surrounded by a jacket pipe 16 for conveying jacket gas, the two pipes 15 and 16 together forming an injection nozzle for injecting reactive substances into the converter. The oxygen-lime mixture is fed at high velocity through the feed pipe 14 into the conical distributor pot 13, producing a vortex in the pot so that the powdered lime is thrown outwards against the wall of the pot. The finely powdered lime circulates several times around the wall of the pot before it finally escapes through one of the radial distributor pipes 15, along which it is conveyed by the current of oxygen before being injected into the melt. A large number of test melts have been made using this system of injection, and they have shown that the powdered lime distributes itself evenly among the injection nozzles, even if the feed of powdered lime fluctuates.

Figure 3:
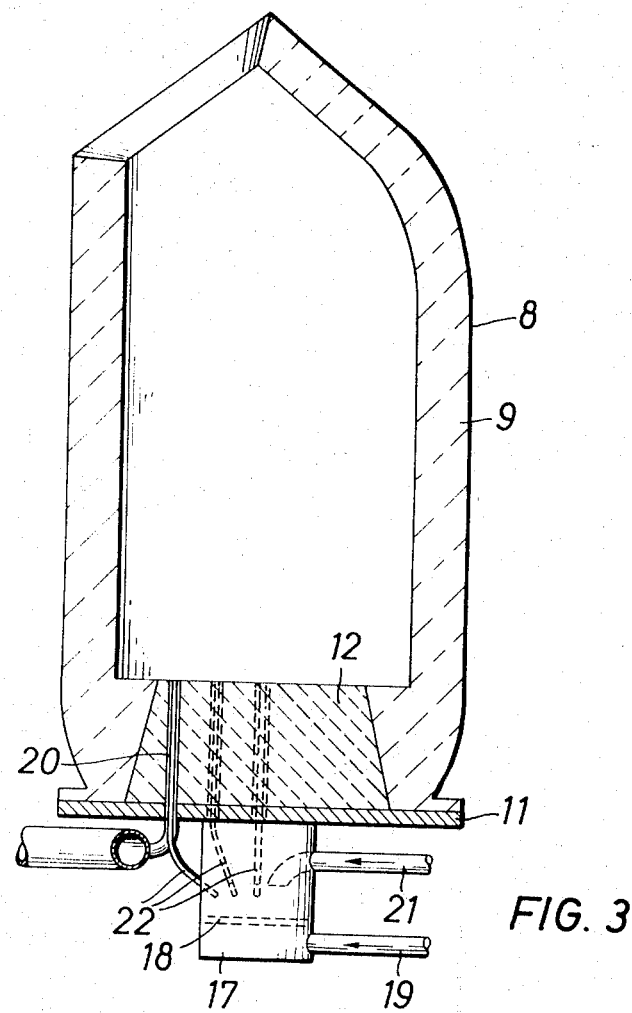
FIG. 3 is a view similar to FIG. 1 but through a modified converter.
Figure 4:
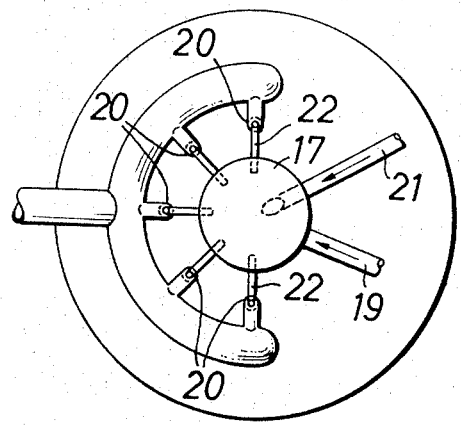
FIG. 4 is a plan view of the bottom of the converter of FIG. 3.

Alternatively, instead of the conical distributor pot 13, there can, as shown in FIGS. 3 and 4, be attached to the base plate 11 a cylindrical distributor pot 17, the interior of which is sub-divided into two compartments by an intermediate partition wall 18 made by a porous material through which gas can pass, that is to say a material permeable to gas. Oxygen is fed in through a feed pipe 19 into the lower part of the cylindrical distributor pot 17. Oxygen-lime mixture is fed into the upper part of the pot through a feed pipe 21. Distributor pipes 22 for the reagents are connected radially and evenly spaced to the upper part of the cylindrical distributor pot 17. When the converter is in operation powdered lime is admitted as a thin, fractional stream conveyed by oxygen at low velocity through the feed pipe 22 into the upper part of the distributor pot 17 the remainder of the oxygen required for the reaction is fed under a high pressure and without any powdered lime through the main oxygen feed pipe 19 into the lower part of the pot 17. The oxygen under pressure passes through the permeable intermediate wall 18, forming a turbulent layer on the upper surface of the intermediate wall 18, to the effect that the powdered lime flows very evenly distributed into the radial pipes 22 and is conveyed into the melt.

Figure 5:
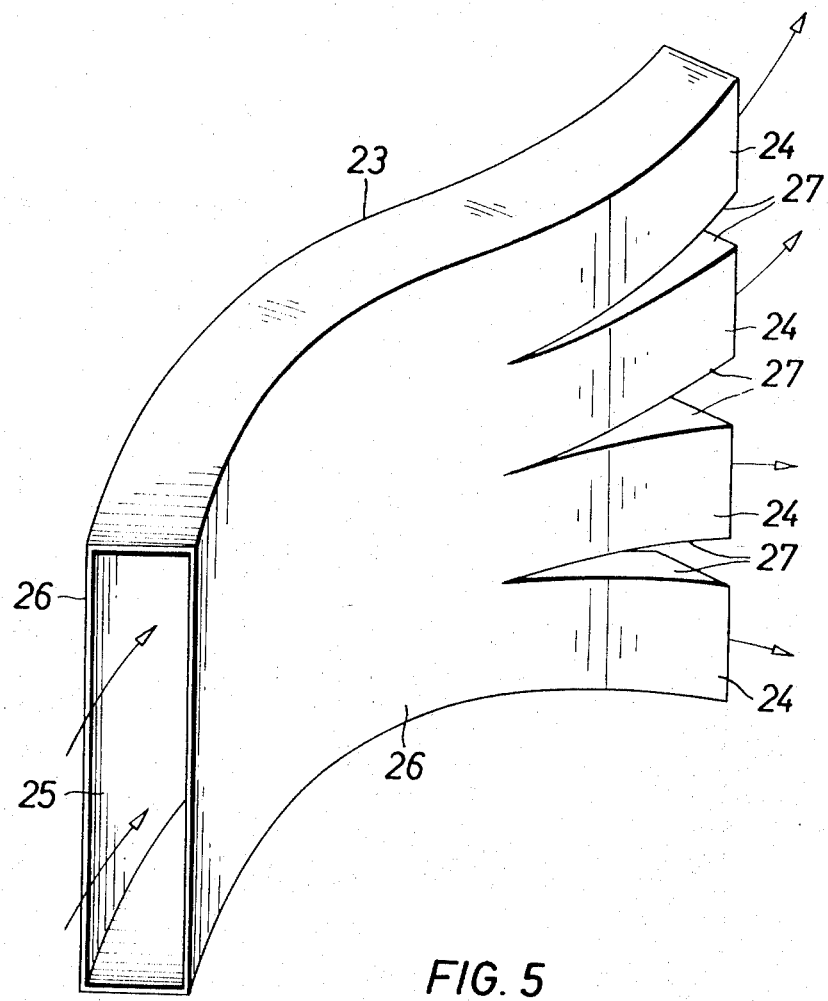
FIG. 5 represents diagramatically another form of distributor for a converter.

FIG. 5 shows a distributor 23 which is a duct of rectangular cross section split at outlet end into several individual ducts 24 each connected to its own distributor pipe (not shown), for feeding the reagents to the melt. The rectangular distributor 23 has a curvature, that is to say its wide sides 26 curve around, to the effect that the powdered lime particles entering at 25 are subjected to a centrifugal force, which is several times normal gravity due to the high velocity of flow. The powdered lime particles therefore distribute themselves as an even layer over the inner surface of the outer wall 26 of the distributor 23. The side walls 27 of the individual channels 24 sub-divide the steam of powdered lime into evenly distributed individual streams, so that here again there is obtained an even distribution of the powdered lime to the several individual nozzles conveying the reagents into the converter.

The process according to the invention has a number of metallurgical advantages and eliminates the two main disadvantages of the customary Thomas process, that is to say the great production of brown smoke and the introduction into the converter of large quantities of nitrogen, which not only increase the nitrogen content of the steel but also involve a considerable loss of heat. The new process gives a quite refining process and the yield is high, partly because very little iron is lost to the slag and partly due to the absence of brown smoke production. A further advantage is that no ballast nitrogen is necessary and consequently very little lime is lost in the effluent gases. The heat losses are also very low. Due to the highly efficient utilisation of the lime, and the resulting high degree of phosphorous removal, a particularly high fraction of scrap can be added to the charge.

We claim:

1. A bottom blow converter for refining a pig iron melt, said converter comprising a steel jacket, a refractory lining within said jacket, a refractory floor inserted at the bottom of said lining, and nozzles consisting of a feed pipe for reagents surrounded by a concentric feed pipe for jacket gas, a distributor mounted underneath said converter floor, a reagent supply pipe connected to said distributor for feeding solid reagents to said distributor and for each of said nozzles, a pipe connecting each said nozzle with said distributor for passing said solids and oxygen mixture to said nozzle, and wherein said distributor is a conical distributor pot mounted underneath said converter floor, said reagent supply pipe being at least one tangentially connected pipe for supplying reagents to said pot, and said reagent feed pipe leading radially from said pot but spaced at a distance from said reagent supply pipe.

2. A bottom blow converter for refining a pig iron melt, said converter comprising a steel jacket, a refractory lining within said jacket, a refractory floor inserted at the bottom of said lining, and nozzles consisting of a feed pipe for reagents surrounded by a concentric feed pipe for jacket gas, a distributor mounted underneath said converter floor, a reagent supply pipe connected to said distributor for feeding solid reagents to said distributor and for each of said nozzles, a pipe connecting each said nozzle with said distributor for passing said solids and oxygen mixture to said nozzle, and wherein said distributor is a cylindrical distributor pot mounted underneath said converter floor, a horizontal gas permeable partition wall subdividing said pot into upper and lower compartments, an oxygen supply pipe connected to said lower compartment, said reagent supply pipe comprising a solids supply pipe connected to said upper compartment, and at least one feed pipe for oxygen-solids mixture leading radially away from said upper compartment to said nozzle.

3. A bottom blow converter for refining a pig iron melt, said converter comprising a steel jacket, a refractory lining within said jacket, a refractory floor inserted at the bottom of said lining, and nozzles consisting of a feed pipe for reagents surrounded by a concentric feed pipe for jacket gas, a distributor mounted underneath said converter floor, a reagent supply pipe connected to said distributor for feeding solid reagents to said distributor and for each of said nozzles, a pipe connecting each said nozzle with said distributor for passing said solids and oxygen mixture to said nozzle, and wherein said distributor is a distributor duct of flat-rectangular cross section mounted underneath the converter floor, means subdividing said duct neat its outlet end into several individual ducts for reagents leading to a number of said nozzles, said distributor duct being curved in a plane perpendicular to its wider sides.

4. A converter according to claim 1, wherein said reagent supply pipe is connected to the upper part of said distributor pot, and there are a number of separate equally spaced reagent feed pipes branching off from the lower part of said pot and leading to a number of said nozzles.

5. A converter according to claim 2, characterised by several feed pipes leading away equally spaced from said pot to a number of said nozzles.

6. A converter according to claim 3, in which separation walls within the outlet end of the distributor duct divide the duct into equally spaced divergent individual ducts merging into equal portions of the radially outermost wider wall of said distributor duct.

* * * * *